US010889385B2

(12) United States Patent
Nfonguem et al.

(10) Patent No.: US 10,889,385 B2
(45) Date of Patent: Jan. 12, 2021

(54) APPARATUS AND METHODS FOR DISTRIBUTING ELECTRIC POWER ON AN AIRCRAFT DURING A LIMITED POWER AVAILABILITY CONDITION

(71) Applicant: BOMBARDIER INC., Dorval (CA)

(72) Inventors: Gustave Nfonguem, Verdun (CA); Vlad Iliescu, Kirkland (CA)

(73) Assignee: BOMBARDIER INC., Dorval (CA)

( * ) Notice: Subject to any disclaimer, the term of this patent is extended or adjusted under 35 U.S.C. 154(b) by 377 days.

(21) Appl. No.: 15/758,361

(22) PCT Filed: Sep. 8, 2016

(86) PCT No.: PCT/IB2016/055362
§ 371 (c)(1),
(2) Date: Mar. 8, 2018

(87) PCT Pub. No.: WO2017/042712
PCT Pub. Date: Mar. 16, 2017

(65) Prior Publication Data
US 2018/0265209 A1   Sep. 20, 2018

Related U.S. Application Data

(60) Provisional application No. 62/217,328, filed on Sep. 11, 2015.

(51) Int. Cl.
*B64D 35/08* (2006.01)
*B64D 41/00* (2006.01)
(Continued)

(52) U.S. Cl.
CPC ............ *B64D 35/08* (2013.01); *B64D 35/02* (2013.01); *B64D 41/00* (2013.01); *B64D 41/007* (2013.01);
(Continued)

(58) Field of Classification Search
CPC ........ B64D 35/08; B64D 35/02; B64D 41/00; B64D 41/007; F02C 7/057; F02C 7/32
(Continued)

(56) References Cited

U.S. PATENT DOCUMENTS 7,870,726 B2   1/2011   Matsui
8,434,301 B2   5/2013   Fukui
(Continued)

FOREIGN PATENT DOCUMENTS

EP   2842869 A1   3/2015
GB   2491982 A    12/2012
JP   569895 A     3/1993

OTHER PUBLICATIONS

PCT international Search Report and Written Opinion dated Dec. 13, 2016 re: International Application No. PCT/IB2016/055362.
(Continued)

*Primary Examiner* — Tomi Skibinski
(74) *Attorney, Agent, or Firm* — Norton Rose Fulbright Canada LLP (57) ABSTRACT

Methods and apparatus for distributing electric power from a power source of an aircraft to a plurality of electrical loads of the aircraft during a limited power availability condition are disclosed. An exemplary method comprises: distributing electric power from the power source of the aircraft to the plurality of electrical loads; receiving one or more signals indicative of a demand for electric power by one or more of the plurality of electrical loads; and adjusting the power distribution to the plurality of electrical loads based on the demand for electric power by the one or more plurality of electrical loads. The power distribution is also adjusted to maintain an overall power consumption of the plurality of electrical loads at or below a threshold.

33 Claims, 8 Drawing Sheets

(51) Int. Cl.
   *B64D 35/02*   (2006.01)
   *F02C 7/057*   (2006.01)
   *F02C 7/32*    (2006.01)
   *F15B 20/00*   (2006.01)

(52) U.S. Cl.
   CPC ............. *F02C 7/057* (2013.01); *F02C 7/32* (2013.01); *F15B 20/00* (2013.01); *B64D 2221/00* (2013.01); *F05D 2220/34* (2013.01); *F05D 2220/50* (2013.01); *Y02T 50/40* (2013.01)

(58) Field of Classification Search
   USPC ........................................... 307/9.1
   See application file for complete search history.

(56) References Cited

U.S. PATENT DOCUMENTS 8,490,918 B2    7/2013  Fukui
   8,500,063 B2    8/2013  Nakagawa et al.
   8,740,155 B2    6/2014  Fervel et al.
   2012/0221157 A1* 8/2012  Finney ................ F02C 7/32
                                                700/287
   2014/0000737 A1   1/2014  Hansen et al.
   2014/0294604 A1  10/2014  Buzzard

OTHER PUBLICATIONS

English translation of Japan patent document No. JPH0569895 dated Mar. 23, 1993, https://www33.orbit.com/?locale=en&ticket=5387e54d-e2d7-434c-9bd2-92a09ee92b5e#PatentDocumentPage, accessed on Dec. 19, 2017.

J.Loughmiller, Emerging Technologies: Distributed Electro-Hydraulic Systems, Design News, Dec. 14, 2009, www.designnews.com/document . . . , accessed on Dec. 1, 2014.

* cited by examiner

APPARATUS AND METHODS FOR DISTRIBUTING ELECTRIC POWER ON AN AIRCRAFT DURING A LIMITED POWER AVAILABILITY CONDITION

CROSS-REFERENCE TO RELATED APPLICATION(S)

The present application is a national phase application under 35 U.S.C. 371 of International Patent Application No. PCT/IB2016/055362 filed on Sep. 8, 2016, which claims priority from U.S. Provisional Patent Application No. 62/217,328 filed on Sep. 11, 2015, the entire contents of which are hereby incorporated by reference.

TECHNICAL FIELD

The disclosure relates generally to electric power distribution on aircraft, and more particularly, to distributing electric power from a power source such as an air-driven generator of an aircraft to a plurality of electrically-powered hydraulic pumps and/or other electrical loads of the aircraft during a limited power availability condition.

BACKGROUND OF THE ART

During an emergency condition on an aircraft where the main electric power sources have become unavailable, some aircraft systems that are considered essential to continue flight and safe landing of the aircraft are typically powered using an emergency power source such as an air-driven generator (ADG). The ADG is typically driven by a ram air turbine. Under normal conditions, the ram air turbine is stowed into the fuselage or wing of the aircraft and is deployed automatically or manually in the event of a loss of the main electric power sources. The ADG driven by the ram air turbine generates a limited amount of electric power from the airstream due to the speed of the aircraft.

Electric power produced by the ADG can be used to power a hydraulic pump of a traditional centralized hydraulic system of the aircraft that may be used to actuate some flight control surfaces of the aircraft. Such centralized hydraulic system typically comprises a central reservoir and a power generation unit which serves a plurality of hydraulic power users. For large aircraft, such centralized hydraulic systems can require a relatively large amount of power, can be relatively heavy, expensive and the hydraulic network can cause energy losses in the hydraulic fluid. Improvement is desirable.

SUMMARY

In one aspect, the disclosure describes a method for distributing electric power from an air-driven generator of an aircraft to a plurality of electrically-powered hydraulic pumps of the aircraft. The method being performed using a controller and comprising:

distributing electric power generated by the air-driven generator of the aircraft to the plurality of the electrically-powered hydraulic pumps of the aircraft via respective current limiters each having a variable set point;

receiving one or more signals indicative of a demand for electric power by one or more of the plurality of electrically-powered hydraulic pumps of the aircraft; and adjusting the set point of one or more of the current limiters based on the demand and to maintain an overall power consumption of the plurality of electrically-powered hydraulic pumps at or below a predetermined threshold.

The one or more signals may be indicative of the demand for electric power by each of the plurality of electrically-powered hydraulic pumps and the set point of the one or more of the current limiters may be adjusted to distribute electric power to the electrically-powered hydraulic pumps proportionally based on the demand.

The one or more signals indicative of the demand for electric power may be indicative of an operating parameter of the one or more electrically-powered hydraulic pumps.

The one or more signals indicative of the demand for electric power may be indicative of an operating speed of the one or more electrically-powered hydraulic pumps.

The method may comprise adjusting a set point associated with a current limiter for an electrically-powered hydraulic pump having a higher operating speed to a higher value than a set point associated with a current limiter for an electrically-powered hydraulic pump having a lower operating speed.

The one or more signals indicative of the demand for electric power may be indicative of an operating pressure of the one or more electrically-powered hydraulic pumps.

The method may comprise adjusting a set point associated with a current limiter for an electrically-powered hydraulic pump having a lower operating pressure to a higher value than a set point associated with a current limiter for an electrically-powered hydraulic pump having a higher operating pressure.

In another aspect, the disclosure describes a method for distributing electric power from a power source of an aircraft to a plurality of electrical loads of the aircraft during a limited power availability condition. The method comprises:

distributing electric power from the power source of the aircraft operating during the limited power availability condition to the plurality of electrical loads of the aircraft;

receiving one or more signals indicative of a demand for electric power by one or more of the plurality of electrical loads of the aircraft; and adjusting the power distribution to the plurality of electrical loads based on the demand for electric power by the one or more plurality of electrical loads and to maintain an overall power consumption of the plurality of electrical loads at or below a threshold.

The one or more signals may be indicative of the demand for electric power by each of the plurality of electrical loads and the power distribution may be adjusted to distribute electric power to the electrical loads proportionally based on the demand.

The one or more signals indicative of the demand for electric power may be indicative of an operating parameter of the one or more electrical loads.

The one or more electrical loads may each comprise an electrically-powered hydraulic pump and the one or more signals indicative of the demand for electric power may be indicative of an operating speed of the one or more electrically-powered hydraulic pumps.

The method may comprise distributing more power to an electrically-powered hydraulic pump having a higher operating speed than to an electrically-powered hydraulic pump having a lower operating speed.

The one or more electrical loads may each comprise an electrically-powered hydraulic pump and the one or more signals indicative of the demand for electric power may be indicative of an operating pressure of the one or more electrically-powered hydraulic pumps.

The method may comprise distributing more power to an electrically-powered hydraulic pump having a lower operating pressure than to an electrically-powered hydraulic pump having a higher operating pressure.

Adjusting the power distribution may comprise adjusting a set point of one or more current limiters respectively associated with one or more of the electrical loads.

The power source may comprise an air-driven generator of the aircraft.

The plurality of electrical loads may comprise a plurality of electrically-powered hydraulic pumps.

The one or more electrical loads may each comprise an electric motor and the one or more signals indicative of the demand for electric power may be indicative of an operating speed of the one or more electric motors.

The one or more electrical loads may each comprise an electric motor and the one or more signals indicative of the demand for electric power may be indicative of an output torque of the one or more electric motors.

The one or more signals indicative of the demand for electric power may be indicative of an output of the one or more electrical loads.

The one or more signals indicative of the demand for electric power may be indicative of an output of the one or more electrical loads.

In another aspect, the disclosure describes an apparatus for distributing electric power from a power source of an aircraft to a plurality of electrical loads of the aircraft during a limited power condition. The apparatus comprises:

a plurality of limiters respectively associated with each of the electrical loads and respectively configured to limit an amount of electric power distributed from the power source to each of the electrical loads, each limiter having a variable set point; and a controller configured to:

receive one or more signals indicative of a demand for electric power by one or more of the plurality of electrical loads of the aircraft; and adjust the set point of one or more of the limiters based on the demand and to maintain an overall power consumption of the plurality of electrical loads at or below a predetermined threshold.

The one or more signals may be indicative of the demand for electric power by each of the plurality of electrical loads and the controller may be configured to adjust the set point of the one or more of the limiters to distribute electric power to the electrical loads proportionally based on the demand.

The one or more signals indicative of the demand for electric power may be indicative of an operating parameter of the one or more electrical loads.

The one or more electrical loads may each comprise an electrically-powered hydraulic pump and the one or more signals indicative of the demand for electric power may be indicative of an operating speed of the one or more electrically-powered hydraulic pumps.

The controller may be configured to adjust a set point associated with a limiter for an electrically-powered hydraulic pump having a higher operating speed to a higher value than a set point associated with a limiter for an electrically-powered hydraulic pump having a lower operating speed.

The one or more electrical loads may each comprise an electrically-powered hydraulic pump and the one or more signals indicative of the demand for electric power may be indicative of an operating pressure of the one or more electrically-powered hydraulic pumps.

The controller may be configured to adjust a set point associated with a limiter for an electrically-powered hydraulic pump having a lower operating pressure to a higher value than a set point associated with a limiter for an electrically-powered hydraulic pump having a higher operating pressure.

The power source may comprise an air-driven generator of the aircraft.

The plurality of electrical loads may comprise a plurality of electrically-powered hydraulic pumps.

The one or more electrical loads may each comprise an electric motor and the one or more signals indicative of the demand for electric power may be indicative of an operating speed of the one or more electric motors.

The one or more electrical loads may each comprise an electric motor and the one or more signals indicative of the demand for electric power may be indicative of an output torque of the one or more electric motors.

The one or more signals indicative of the demand for electric power may be indicative of an output of the one or more electrical loads.

The one or more signals indicative of the demand for electric power may be indicative of an input to the one or more electrical loads.

The limiters may comprise electric current limiters.

In a further aspect, the disclosure describes an aircraft comprising an apparatus as disclosed herein.

Further details of these and other aspects of the subject matter of this application will be apparent from the detailed description and drawings included below.

DESCRIPTION OF THE DRAWINGS

Reference is now made to the accompanying drawings, in which.

DETAILED DESCRIPTION

This disclosure relates generally to electric power distribution on aircraft during limited power availability (e.g., emergency or failure) conditions. In particular, the disclosure relates to distributing electric power from a power source to electrical loads such as electrically-powered hydraulic pumps of aircraft having a distributed hydraulic system and/or electrical loads associated with one or more other aircraft system(s). In some embodiments, the power source may be an air-driven generator of the aircraft and the electric power may be distributed to the electrical loads based on demand so that one or more electrical loads requiring a larger amount of electric power may be given priority to receive more electric power over one or more other electrical loads requiring a smaller amount of electric power. In some embodiments, electric power produced by the power source may be distributed to the electrical loads to maintain an overall power consumption of the electrical loads at or below a predetermined threshold. The threshold may be selected based on the (e.g., generating) capacity of the power source and the portion of such capacity that may be allocated to the particular electrical load(s).

For the purpose of the present disclosure, the expression "limited power availability" is intended to encompass operating conditions where the electrical power available (i.e., supply) to power the electrical loads is below the potential total demand for electric power by the electrical loads. For example, such operating conditions may include a situation where the main electric power source(s) of an aircraft or of another vehicle are not available and some alternate (i.e., back-up, emergency) electric power source is used to power at least some of the electrical loads of the aircraft or vehicle. Such operating conditions may include a situation where one or more of the electric power source(s) of the aircraft or other vehicle is/are not available and a reduce amount of electrical power is available from one or more other electrical power source(s) of the aircraft or vehicle. Such operating conditions may include a situation where the electrical power available onboard the aircraft or vehicle is lower than is normally available under normal operating conditions of the aircraft or vehicle.

During an emergency condition where the main electric power sources are lost (e.g., due to failure) on an aircraft comprising a traditional centralized hydraulic system, electric power from an air-driven generator may be used to power a hydraulic pump of the centralized hydraulic system. Since the hydraulic power users draw hydraulic fluid from a common reservoir of such centralized system and assuming that the power produced by the pump is kept constant, power distribution to the hydraulic power users will inherently be based on demand so that one hydraulic power user with a higher demand for power (higher power need) will receive more hydraulic fluid than another hydraulic power user with a lower demand for power (lower power need). For example, in a situation where two independently loaded identical actuators are drawing fluid from a common manifold, if the first actuator is commanded to move faster than the second actuator, the first actuator will draw more fluid and cause the second actuator to receive less fluid if the pump power delivery is kept constant and the power consumed by the first and second actuators equals the pump power delivery. In other words, the configuration of traditional centralized hydraulic systems inherently allows for priority to be given to the hydraulic power user having the higher demand for power.

However, for an aircraft having a distributed hydraulic system with local pumps and reservoirs dedicated to a single or a local group of hydraulic power users, the power distribution based on demand that is inherent to traditional centralized hydraulic systems is not inherent to distributed hydraulic systems. In some embodiments, apparatus and methods disclosed herein may be useful in distributing power to hydraulic power users of a distributed hydraulic system based on demand in a manner that may be considered analogous to that of traditional centralized hydraulic systems.

In some embodiments, the distributed hydraulic system disclosed herein may comprise one or more local hydraulic power packs (also known as hydraulic power units) that may be disposed proximal to the applicable power user(s). In some embodiments, the use of a distributed hydraulic system as disclosed herein may eliminate the need for a centralized hydraulic system in an aircraft. In comparison with a traditional centralized hydraulic system, the use of one or more local hydraulic power packs in a distributed hydraulic system may, in some situations, result in improvements in efficiency, reduction in the complexity of hydraulic networks, weight reduction, the alleviation of some certification issues, and/or, alleviation of system manufacturing and installation. For some applications, the use of a distributed system instead of a traditional centralized system may provide an overall cost reduction.

Aspects of various embodiments are described through reference to the drawings.

Figure 1:
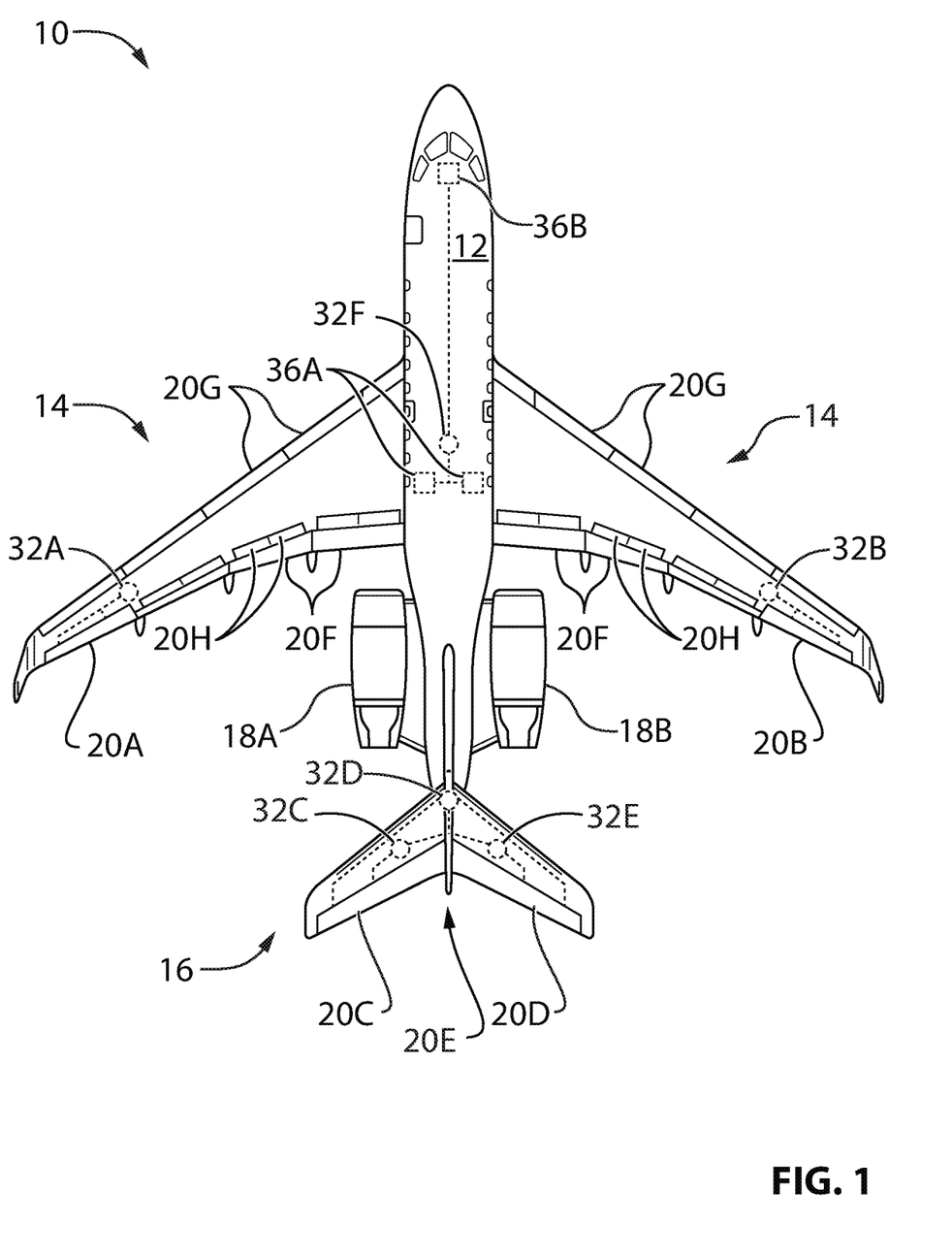
FIG. 1 shows a top plan view of an exemplary aircraft comprising a distributed hydraulic system shown in schematic form.

FIG. 1 shows a top plan view of an exemplary aircraft 10 comprising a distributed hydraulic system shown in schematic form and overlaid thereon for illustration purpose. Aircraft 10 may be a fixed-wing aircraft. Aircraft 10 may be any suitable aircraft such as corporate, private, commercial or any other type of aircraft. For example, aircraft 10 may be a narrow-body, twin engine jet airliner. Aircraft 10 may comprise an aircraft structure including fuselage 12, one or more wings 14 and empennage 16. Aircraft 10 may comprise one or more engines 18A, 18B mounted to the aircraft structure. In various embodiments of aircraft 10, one or more of engines 18A, 18B may be mounted to wings 14 and/or to fuselage 12.

One or more flight control surfaces 20 (e.g., 20A-20H) may be movably attached to the aircraft structure. Such flight control surfaces 20 may be actuatable (e.g., adjustable) in order to permit control of the movement of aircraft 10 during flight. Some of flight control surfaces 20 may be primary flight control surfaces that may be used to control rotation of aircraft 10 about the longitudinal axis, the lateral or transverse axis, and the vertical axis of aircraft 10. For example, aircraft 10 may comprise one or more ailerons 20A, 20B as primary flight control surface(s) for controlling rotation about the longitudinal axis (i.e., roll); aircraft 10 may comprise one or more elevators 20C, 20D as primary flight control surface(s) for controlling rotation about the lateral or transverse axis (i.e., pitch); and, aircraft 10 may comprise one or more rudders 20E as primary flight control surface(s) for controlling rotation about the vertical axis (i.e., yaw). Aircraft 10 may comprise other flight control surfaces such as one or more flaps 20F, one or more slats 20G and/or one or more spoilers 20H.

The distributed hydraulic system of aircraft 10 may comprise one or more local hydraulic power packs (HPPs)

32A-32F (referred generically as "HPP 32") disposed in close proximity to their respective flight control surface(s) 20 or other hydraulic power user(s) which they may serve. For example, each HPP 32 may be disposed as close as practically possible to its respective hydraulic power user(s) based on the space available for HPP 32 in aircraft 10 in the region of the hydraulic power user in question. HPP 32 may be configured to provide pressurized hydraulic fluid for actuating one or more flight control surfaces 20. In various embodiments one or more HPPs 32 may be disposed in regions of aircraft 10 that are not pressurized during flight.

For example, HPPs 32A, 32B may be disposed inside respective wings 14 and may be configured to provide pressurized hydraulic fluid for actuating ailerons 20A, 20B respectively and/or other flight control surface(s) 20 attached to wings 14. HPPs 32A, 32B may be disposed closer to the tip than the root of respective wings 14 such as, for example, at a location outboard of one or more fuel tanks 30 inside wings 14 depending on the space available inside wings 14 to accommodate HPPs 32A, 32B. In some embodiments, each of HPPs 32A, 32B may be located in a same structural bay between two structural ribs as actuator(s) 34 (see FIG. 2) associated with respective ailerons 20A, 20B. It is understood that specific distances between HPPs 32A, 32B and their respective actuator(s) 34 will depend on the size and configuration of aircraft 10.

HPPs 32C, 32D and 32E may be disposed in an aft portion of aircraft 10 and may be configured to provide pressurized hydraulic fluid for actuating elevators 20C, 20D and rudder 20E. For example, one or more of HPPs 32C, 32D and 32E may be disposed inside empennage 16 (e.g., horizontal stabilizer and/or vertical stabilizer). In various embodiments, HPPs 32C, 32D and 32E may be disposed in close proximity to elevators 20C, 20D and rudder 20E depending on the space available inside the aft portion of aircraft 10 to accommodate HPPs 32C, 32D and 32E. For example, each of HPPs 32C, 32D and 32E may be located in a same structural bay as actuator(s) 34 (see FIG. 2) associated with a respective one of elevators 20C, 20D and rudder 20E. Again, it is understood that specific distances between HPPs 32C, 32D and 32E and their respective actuator(s) 34 will depend on the size and configuration of aircraft 10.

HPP 32F may be disposed inside fuselage 12 of aircraft 10 and may be configured to provide pressurized hydraulic fluid to one or more actuators 36A associated with a main landing gear of aircraft 10 and/or one or more actuators 36B associated with a nose landing gear of aircraft 10. For example, one or more actuators 36B may be configured to deploy/retract the nose landing gear and one or more actuators 36B may be configured to power the nose wheel steering. Again, it is understood that specific distances between HPPs 32F and its respective actuator(s) 36A, 36B will depend on the size and configuration of aircraft 10.

The use of HPPs 32A-32F may eliminate the need for one or more traditional centralized hydraulic systems on aircraft 10. In some embodiments, the pressurized hydraulic fluid supplied to various power users associated with respective HPPs 32 may be supplied exclusively by their respective HPPs 32 so that reliance on a centralized hydraulic system is not required. For example, aileron 20A may be actuated exclusively via HPP 32A and aileron 20B may be actuated exclusively via HPP 32B. The hydraulic actuators 34 (see FIG. 2) associated with ailerons 20A, 20B, elevators 20C, 20D and rudder 20E may not be coupled to receive pressurized hydraulic fluid from a centralized hydraulic system in any situation so that aircraft 10 may not comprise a traditional centralized hydraulic system.

Figure 2:
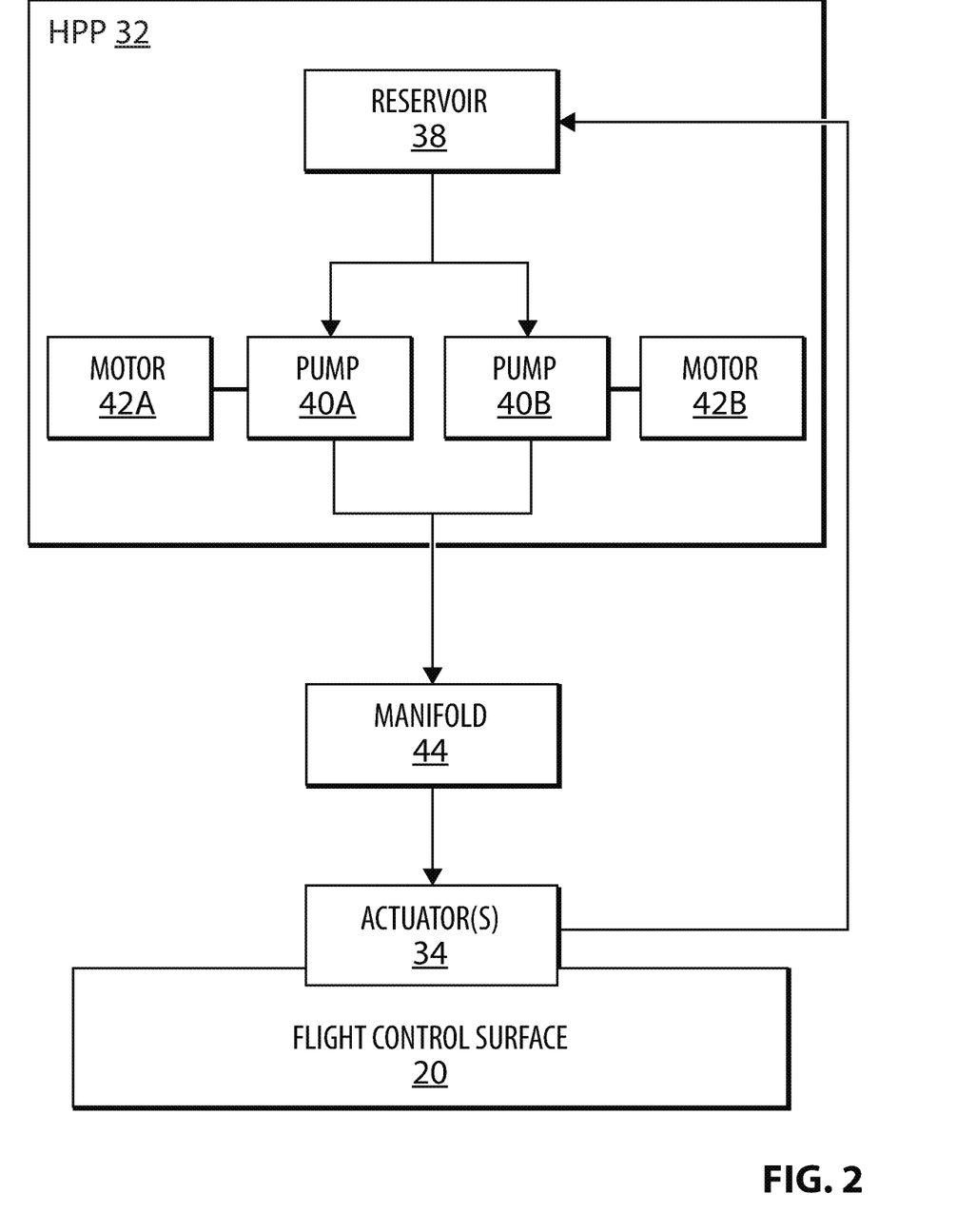
FIG. 2 shows a schematic representation of an exemplary local hydraulic power pack of the distributed hydraulic system of FIG. 1 for actuating a flight control surface of the aircraft of FIG. 1.

FIG. 2 shows a schematic representation of an exemplary local HPP 32 of the distributed hydraulic system of FIG. 1 for actuating an exemplary flight control surface 20. Local HPPs 32 may be considered self-contained hydraulic power generation units that integrate in a single package typical components required to perform the hydraulic power generation function. HPP 32 may comprise reservoir 38 for the hydraulic fluid and one or more pumps 40A, 40B for pressurising the hydraulic fluid. Reservoir 38 may be a common reservoir that supplies both hydraulic pumps 40A, 40B. HPP 32 may be configured to combine the hydraulic fluid pressurized by both hydraulic pumps 40A, 40B so that the flow of pressurized hydraulic fluid supplied by the two pumps 40A, 40B may be combined (i.e., summed) before the pressurized hydraulic fluid is delivered to the hydraulic power user(s).

Pumps 40A, 40B may be independently driven by separate electric motors 42A, 42B, which may be independently controlled. The separate electric motors 42A, 42B may be powered by different respective electric power busses that may be available on aircraft 10 during normal (i.e., non-emergency) operation. The pressurized hydraulic fluid produced by HPP 32 (i.e., delivered by pumps 40A, 40B) may be received into manifold 44 and delivered to one or more actuators 48 for actuating flight control surface 20. HPP 32 may comprise or be coupled to one or more power and control modules that may be configured to carry out control, monitoring and/or power conditioning functions according to suitable methods for electric motors 42A, 42B. In some embodiments, each electric motor 42A, 42B may have its own dedicated power and control module. HPP 32 may also comprise or may be coupled to other components not shown herein such as suitable hydraulic fluid conditioning components such as heat exchanger(s) and hydraulic fluid filter(s).

Actuator(s) 34 may comprise hydraulic rams integrated into hydraulic power control units (PCUs) of suitable types for actuating the applicable flight control surface 20. Actuator(s) 34 may be connected to HPP 32 via a suitable pressure line and return line to permit hydraulic fluid to be returned to reservoir 38. HPP 32 and/or PCUs incorporating actuators 34 may be coupled to a flight control system of aircraft 10 for control and monitoring purposes. In various embodiments, flight control surface 20 may be actuated via a single or a plurality of (e.g., two or more) actuators 34. In some embodiments, each HPP 32 may be dedicated to supplying pressurized hydraulic fluid for the actuation of a single flight control surface 20 (i.e., one or more actuators 34 for a single flight control surface 20). Alternatively, one or more HPPs 32 may be dedicated to supplying pressurized hydraulic fluid for the actuation of a plurality of flight control surfaces 20 disposed in relatively close proximity to each other in a region of aircraft 10.

Figure 3:
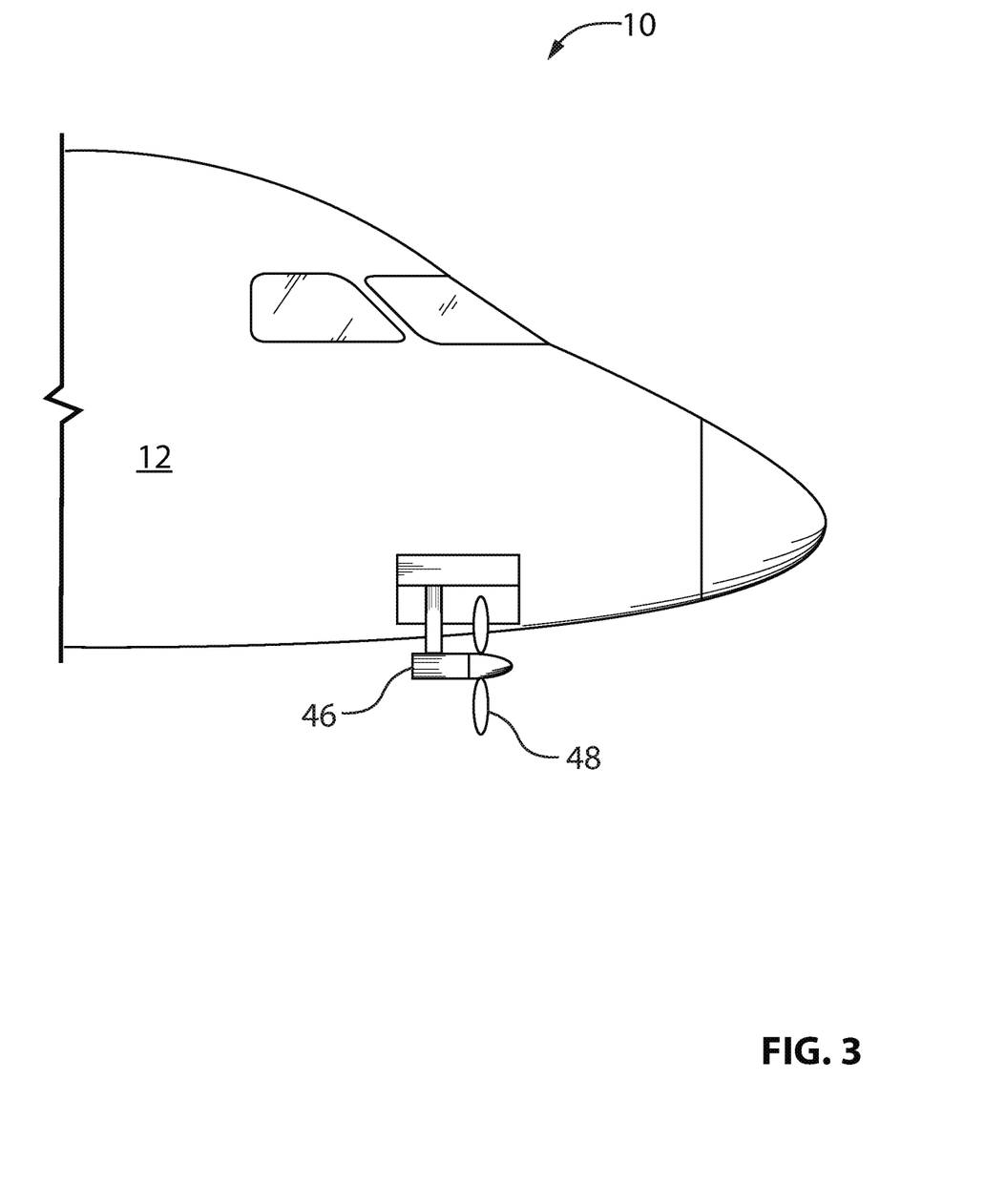
FIG. 3 is side elevation view of a forward portion of the fuselage of the aircraft of FIG. 1 showing a schematic representation of a deployed air-driven generator and an associated ram air turbine.

FIG. 3 is side elevation view of a forward fuselage portion of aircraft 10 of FIG. 1 showing an exemplary deployed air-driven generator 46 (referred hereinafter as "ADG 46") and an associated ram air turbine 48 (referred hereinafter as "RAT 48"). As explained below, ADG 46 may be deployed during an emergency condition and used to provide electric power to essential systems and devices of aircraft 10 including one or more HPPs 32.

Figure 4:
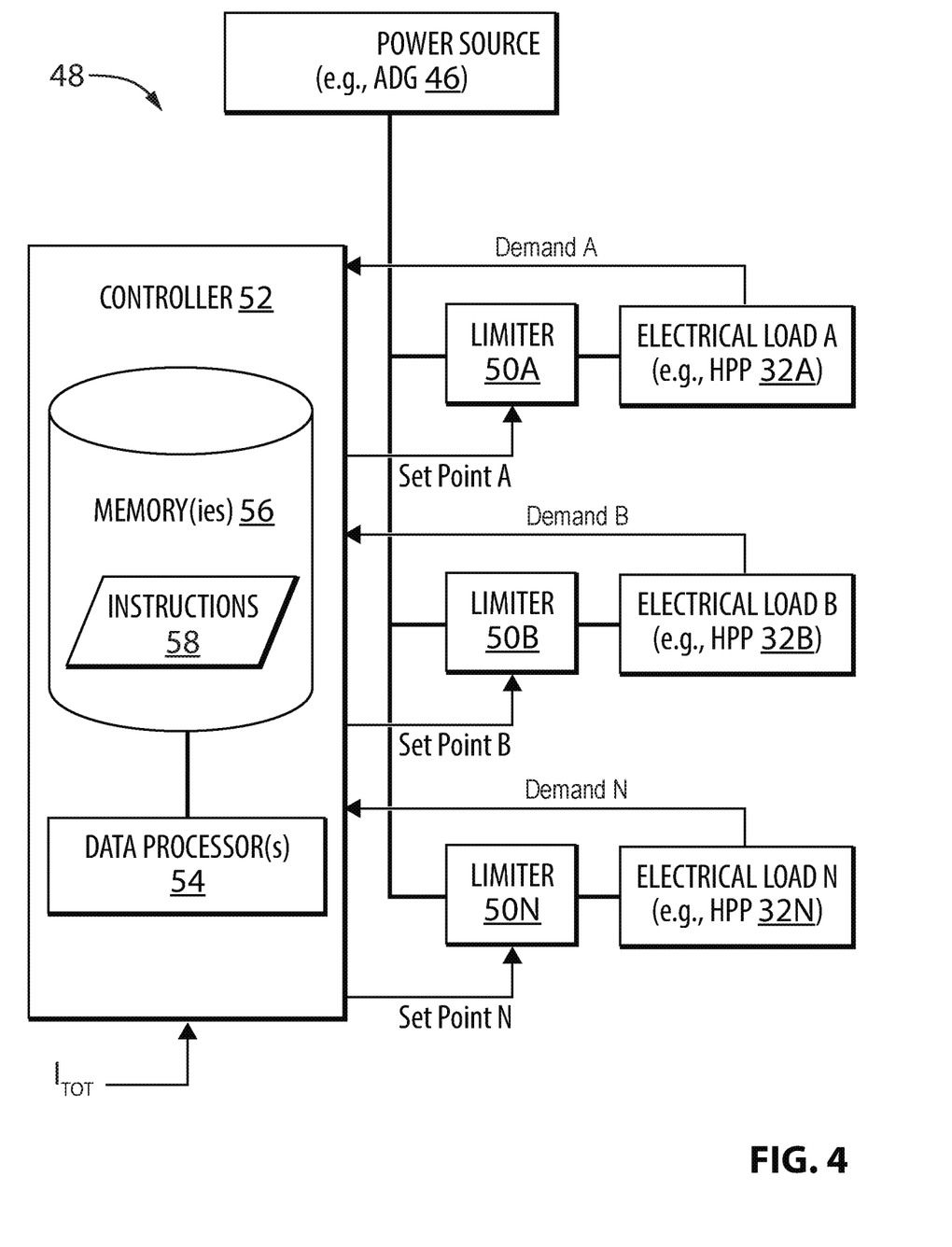
FIG. 4 is an exemplary schematic representation of an apparatus for distributing electric power from a power source to a plurality of electrical loads during a limited power availability condition.

FIG. 4 is a schematic representation of an exemplary apparatus 48 for distributing electric power from a power source such as, for example, ADG 46 or other available power source(s) (e.g., generator or battery) of aircraft 10 to a plurality of electrical loads A-N during a limited power availability condition. Such electrical loads A-N may be associated with one or more systems of aircraft 10 such as a hydraulic system, an environment control system (ECS), a flight control actuation system, etc. Accordingly, examples of such electrical loads A-N may include HPPs 32 of aircraft 10, electric motors 42A, 42B, other electric motors, electrically driven actuators, etc. Such limited power availability condition may include a situation where the main electric power source(s) of aircraft 10 are not available and ADG 46 has been deployed for the purpose of providing electric power to some aircraft systems including some HPPs 32 that are considered essential to continue flight and safe landing of aircraft 10.

In some embodiments, apparatus 48 may comprise one or more active power limiting/control devices (i.e., limiters) to control how much electric power is distributed from power source 46 to each electrical load A-N. In some embodiments, such limiters may be current limiters 50 (e.g., 50A-50N) of suitable type respectively associated with each electrical load A-N. Each current limiter 50 may have a variable set point representing a maximum amount of electrical current permitted to flow through current limiter 50. For example, current limiters 50 may each comprise circuitry configured to actively impose an upper limit on the current that may be delivered to respective electrical loads A-N. Unlike a fuse, current limiters 50 would not cause respective loads A-N to become disconnected from ADG 46 in the event of current exceeding a threshold but would instead actively limit the current while still permitting current to be delivered to the respective loads A-N.

The electric power consumed by an electrical load A-N, is function of its current draw and voltage across the electrical load A-N. In some embodiments, the limiter may be configured to control the power consumed by one or more of loads A-N by controlling the current and/or voltage in the electrical feed line(s) of the associated load(s) A-N. In some embodiments, the operating speed of HPPs 32 may be controlled via electrical current so limiting current delivered to HPPs 32 may be an appropriate method of controlling its/their power consumption.

Apparatus 48 may also comprise controller 52 configured to receive one or more signals indicative of a demand for electric power (i.e., power need) for one or more of the plurality of electrical loads A-N of aircraft 10 and adjust the set point of one or more current limiters 50A-50N based on the demand and also to maintain an overall power consumption of the plurality of electrical loads 32 at or below a predetermined threshold $I_{TOT}$. Adjusting the set point(s) may comprise modifying (i.e., replacing) an existing set point or imposing a new set point. In some embodiments, controller 52 may comprise or may be part of a flight control computer or other part of the avionics suite of aircraft 10. In some embodiments, controller 52 may be embedded in an electrical system of aircraft 10 or packaged with one or more electrical loads A-N. During the limited power availability condition, controller 52 may be powered via battery (not shown), ADG 46 or any other suitable power source of aircraft 10. In some embodiments, controller 52 may be configured to monitor the power consumption of each electrical load A-N individually and/or monitor an overall (i.e., total) power consumption of all of electrical loads A-N collectively. Accordingly, if the overall power consumption of electrical loads A-N based on the real power demands would not exceed the predetermined threshold $I_{TOT}$, it may not be necessary for controller 52 to impose such limits via current limiters 50.

Controller 52 may comprise one or more data processors 54 (referred hereinafter as "processor 54"). Processor 54 may be, for example, any type of general-purpose microprocessor or microcontroller, a digital signal processing (DSP) processor, an integrated circuit, a field programmable gate array (FPGA), a reconfigurable processor, a programmable read-only memory (PROM), any combination thereof or other suitably programmed or programmable logic circuits. Controller 52 may comprise machine-readable memory(ies) 56 (referred hereinafter as "memory 56"). Memory 56 may comprise any storage means (e.g. devices) suitable for retrievably storing machine-readable instructions 58 executable by processor 54. Memory 56 may comprise tangible, non-transitory medium. Memory 56 may include any suitable type of computer memory that is located either internally or externally to controller 52 such as, for example, random-access memory (RAM), read-only memory (ROM), compact disc read-only memory (CDROM), electro-optical memory, magneto-optical memory, erasable programmable read-only memory (EPROM), electrically-erasable programmable read-only memory (EEPROM), Ferroelectric RAM (FRAM) or the like.

Various aspects of the present disclosure may be embodied as an apparatus, method or computer program product. Accordingly, aspects of the present disclosure may take the form of an entirely hardware embodiment, an entirely software embodiment (including firmware, resident software, micro-code, etc.) or an embodiment combining software and hardware aspects. Furthermore, aspects of the present disclosure may take the form of a computer program product embodied in one or more non-transitory computer readable medium(ia) having computer readable program code (machine-readable instructions) embodied thereon. The computer program product may, for example, be executed by a computer, processor or other suitable logic circuit to cause the execution of one or more methods disclosed herein in entirety or in part. For example, such computer program product may comprise computer readable program code for execution by controller 52. Computer program code for carrying out operations for aspects of the present disclosure may be written in any combination of one or more programming languages, including an object oriented programming language such as Java, Smalltalk, C++ or the like and conventional procedural programming languages, such as the "C" programming language or other programming languages. The program code may execute entirely or in part by controller 52 or other computer. For example, machine readable instructions 58 may be configured to cause controller 52 to carry out at least part of the control strategies and/or methods described herein.

In some embodiments, the one or more signals may be indicative of the demand for electric power by each of the plurality of electrical loads A-N. Controller 52 may be configured to adjust the set point of the one or more of the current limiters 50A-50N to distribute electric power to the electrical loads A-N proportionally or otherwise based on demand. The signal(s) indicative of the demand of one or more electrical loads A-N that are received by controller 52 may be indicative of an operating parameter such as an input parameter or an output parameter associated with the one or more electrical loads A-N. As explained below, such operating parameter may, for example, include an operating speed of hydraulic pump 40 or motor 42 of HPP 32, and/or, an operating pressure from manifold 44 of HPP 32. In some embodiments where the one or more electrical loads A-N each comprise an electric motor (e.g., linear or rotary), the one or more signals indicative of the demand for electric power may be indicative of an operating speed of the one or more electric motors. Alternatively or in addition, the one or may be indicative of an output torque or output force of the one or more electric motors. In some embodiments, the one or more signals indicative of the demand for electric power may be indicative of an output of the one or more electrical loads A-N. In some embodiments, the one or more signals indicative of the demand for electric power may be indicative of an input (e.g., current, voltage) to the one or more electrical loads A-N.

The signal(s) indicative of demand could alternatively comprise information other than an actual operating parameter of electrical loads A-N. In some embodiments, the signal(s) indicative of demand could be based on a command for operating one or more electrical loads A-N. For example, a pilot command requesting the movement of a flight control surface 20 could be indicative that one or more HPPs 32 associated with such flight control surface 20 will need more electric power in order to achieve the movement requested by the pilot. Accordingly, one or more signal(s) indicative of such command(s) could be used as a basis for distributing power based on demand.

The set point for each current limiter 50A-50N may represent an upper limit for the amount of electric current that the associated electrical load A-N may draw from power source 46. Controller 52 may adjust the set points so that the overall current draw does not exceed a total current draw ($I_{TOT}$) (i.e., threshold) allocated for the plurality of electrical loads A-N collectively. Accordingly, controller 52 may adjust the set points so as not to exceed $I_{TOT}$ irrespective of the real power demands of the electrical loads A-N. For example, the set points may be adjusted so that the electric power is distributed proportionally based on demand while still maintaining the overall power consumption of all of electrical loads A-N together below the threshold $I_{TOT}$. Controller 52 may be configured to continuously or intermittently monitor the demand of one or more electrical loads A-N and make adjustments to set points of the current limiters 50 as required based on the amount of electric power available from ADG 46 and/or other factors.

Controller 52 may receive a signal representative of $I_{TOT}$ or the value of $I_{TOT}$ may be stored in memory 56 and used by controller 52 for the purpose of adjusting the set point of one or more of electrical loads A-N. The value of $I_{TOT}$ may be predetermined based on a generating capacity of ADG 46 and based on a maximum electric power budget allocated for the plurality of electrical loads A-N. The value of $I_{TOT}$ may be fixed or variable based on the generating capacity (e.g., stall load) of ADG 46, which may vary depending on the airspeed of aircraft 10.

Figure 5:
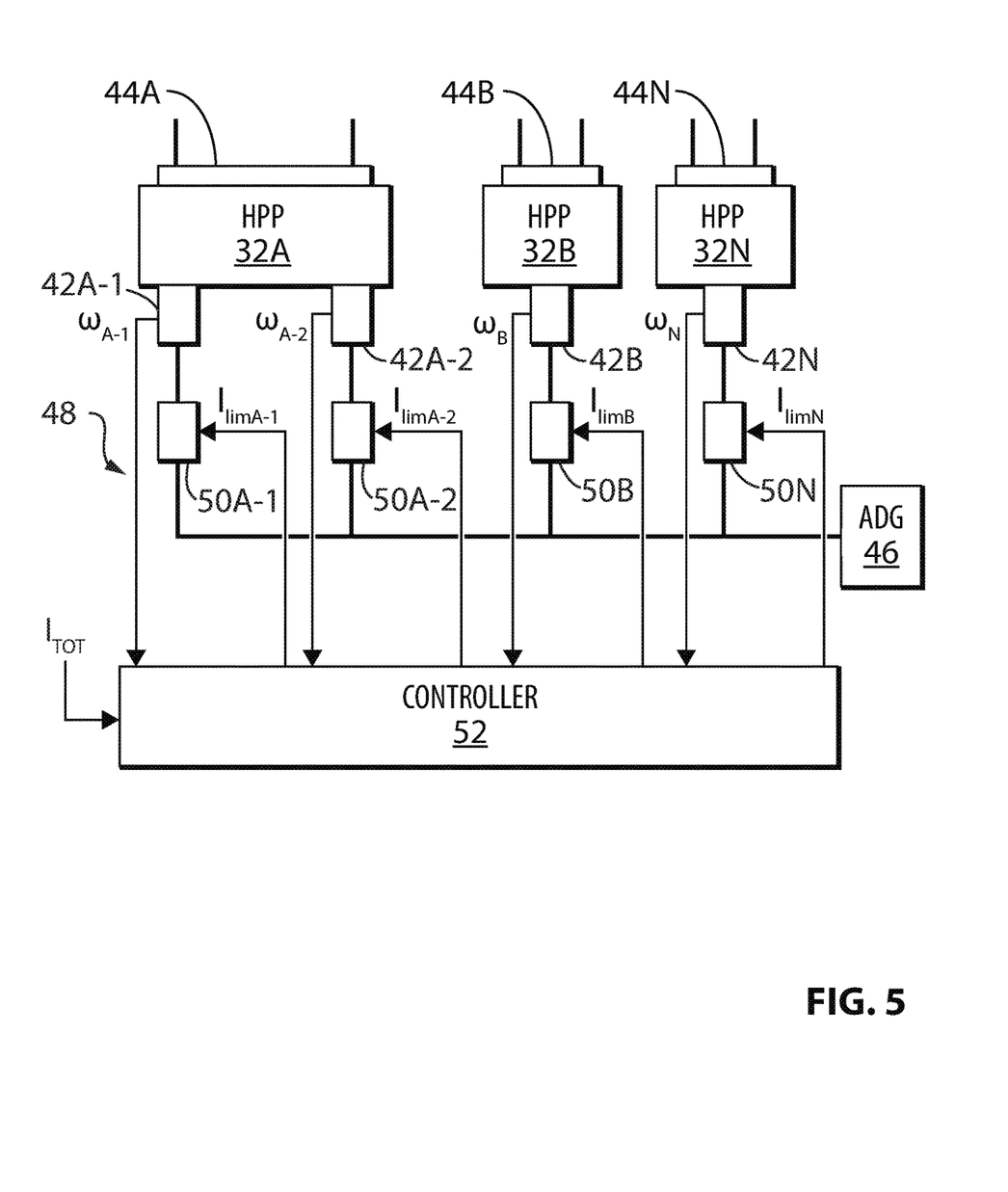
FIG. 5 is another exemplary schematic representation of the apparatus of FIG. 4 for distributing electric power from a power source to a plurality of electrically-driven hydraulic pumps during a limited power availability condition where the operating speeds of the electrically-driven hydraulic pumps are used as an indication of demand for electric power.

FIG. 5 is another schematic representation of an exemplary apparatus 48 for distributing electric power from a power source such as, for example, ADG 46 of aircraft 10 to a plurality of HPPs 32 of aircraft 10 during a limited power availability condition. In this example of apparatus 48, the one or more electrical loads each comprise an electric motor 42A-42N of an electrically-powered hydraulic pump 40 (see FIG. 2) of an HPP 32 and the one or more signals indicative of the demand for electric power are indicative of an operating speed $\omega_A$-$\omega_N$ (e.g., revolutions-per-minute or radians per second) of the one or more electric motors 42A-42N of the corresponding electrically-powered hydraulic pumps 40. As shown in FIG. 5, HPPs 32 may comprise a single electrically-powered hydraulic pump 40 or a plurality of electrically-powered hydraulic pumps 40 as represented by the number of motors 42 illustrated in FIG. 5.

As explained above, controller 52 may be configured to receive operating speeds $\omega_A$-$\omega_N$ and adjust the set points of current limiters 50 accordingly taking into consideration the overall threshold of electric current $I_{TOT}$ not to be exceeded for the plurality of HPPs 32A-32N and also operating speeds $\omega_A$-$\omega_N$ which are indicative of demand.

Electric motors 42A-42N may be controlled to try to maintain an operating pressure (e.g., 1700 or 3000 psi) of hydraulic fluid in their respective manifolds 44A-44N. As an actuator 34 begins to draw more fluid, the pressure, and the corresponding electric motor(s) 42A-42N may in turn be commanded to increase its/their speed to compensate for the additional hydraulic fluid being drawn in order to maintain the desired operating pressure of HPP 32. Accordingly, an increase in the operating speed $\omega_A$-$\omega_N$ of one or more of electric motors 42A-42N may indicate a need for more electric power to be delivered to that one or more electric motors 42A-42N. In accordance with this behavior, controller 52 may be configured to adjust a set point associated with a current limiter 50 for a corresponding electrically-powered hydraulic pump 40 having a higher operating speed $\omega$ to a higher value than a set point associated with a current limiter 50 for an electrically-powered hydraulic pump 40 having a lower operating speed so as to distribute electric power based on demand.

In reference to FIG. 5, HPP 32A may comprise two electric motors 42A-1 and 42A-2 and two current limiters 50A-1 and 50A-2 respectively associated with the two electric motors 42A-1 and 42A-2. The operating speed $\omega_{A-1}$ of electric motor 42A-1 may be used by controller 52 as an indication of demand for electric power by electric motor 42A-1 and set point $I_{limA-1}$ for current limiter 50A-1 may be set by controller 52 to set a limit to the electric current that may be drawn by electric motor 42A-1. Similarly, the operating speed $\omega_{A-2}$ of electric motor 42A-2 may be used by controller 52 as an indication of demand for electric power by electric motor 42A-2 and set point $I_{limA-2}$ for current limiter 50A-2 may be set by controller 52 to set a limit to the electric current that may be drawn by electric motor 42A-2.

HPP 32B may comprise a single electric motor 42B and a single current limiter 50B associated with a single electric motor 42B. The operating speed $\omega_B$ of electric motor 42B may be used by controller 52 as an indication of demand for electric power by electric motor 42B and set point $I_{limB}$ for current limiter 50B may be set by controller 52 to set a limit to the electric current that may be drawn by electric motor 42B. Similarly, HPP 32N may also comprise a single electric motor 42N and a single current limiter 50N associated with electric motor 42N. The operating speed $\omega_N$ of electric motor 42N may be used by controller 52 as an indication of demand for electric power by electric motor 42N and set point $I_{limN}$ for current limiter 50N may be set by controller 52 to set a limit to the electric current that may be drawn by electric motor 42N.

Figure 6:
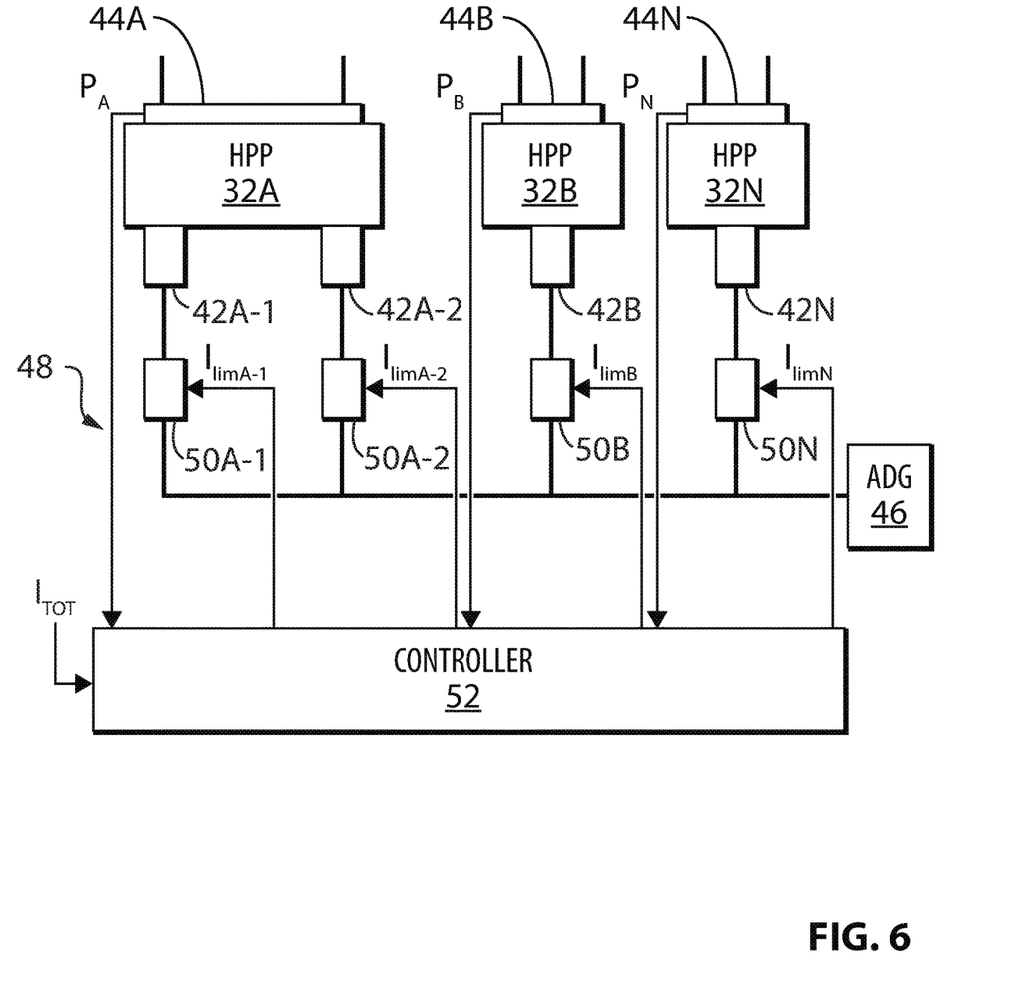
FIG. 6 is another exemplary schematic representation of the apparatus of FIG. 4 for distributing electric power from a power source to a plurality of electrically-driven hydraulic pumps during a limited power availability condition where the operating pressures of the electrically-driven hydraulic pumps are used as an indication of demand for electric power.

FIG. 6 is another schematic representation of an exemplary apparatus 48 for distributing electric power from an power source such as, for example, ADG 46 of aircraft 10 to a plurality of HPPs 32 of aircraft 10 during a limited power availability condition. Many elements of apparatus 48 of FIG. 6 are identical to those of FIG. 5 described above and have been labelled using the same reference characters. In contrast with the apparatus 48 of FIG. 5, the apparatus 48 of FIG. 6 makes use of operating pressures $P_A$-$P_N$ (e.g., pounds per square inch) of HPPs 32A-32N instead of operating speeds $\omega_A$-$\omega_N$ as an indication of demand for electric power by each electrically driven hydraulic pump 40 (see FIG. 2). The operating pressures $P_A$-$P_N$ may be measured at manifolds 44A-44N.

As explained above, a decrease in operating pressure $P_A$-$P_N$ may provide an indication of higher demand for electric power at one or more hydraulic pumps 40. Accordingly, controller 52 may be configured to adjust a set point associated with a current limiter 50 for an electrically-powered hydraulic pump 40 having a lower operating pressure P to a higher value than a set point associated with a current limiter 50 for an electrically-powered hydraulic pump 40 having a higher operating pressure P.

In reference to HPP 32A in FIG. 6, the operating pressure $P_A$ of manifold 44A may be used by controller 52 as an indication of demand for electric power by electric motor 42A-1 and set point $I_{limA-1}$ for current limiter 50A-1 may be adjusted by controller 52 to set a limit to the electric current that may be drawn by electric motor 42A-1. Similarly, the operating pressure $P_A$ of manifold 44A may also be used by controller 52 as an indication of demand for electric power by electric motor 42A-2 and set point $I_{limA-2}$ for current limiter 50A-2 may be adjusted by controller 52 to set a limit to the electric current that may be drawn by electric motor 42A-2.

In reference to HPP 32B in FIG. 6, the operating pressure $P_B$ of manifold 44B may be used by controller 52 as an indication of demand for electric power by electric motor 42B and set point $I_{limB}$ for current limiter 50B may be adjusted by controller 52 to set a limit to the electric current that may be drawn by electric motor 42B. Similarly, in reference to HPP 32N in FIG. 6, the operating pressure $P_N$ of manifold 44N may be used by controller 52 as an indication of demand for electric power by electric motor 42N and set point $I_{limN}$ for current limiter 50N may be set by controller 52 to set a limit to the electric current that may be drawn by electric motor 42N.

As explained above in reference to FIGS. 5 and 6, electric power may be distributed proportionally or otherwise based on demand as determined from the operating speed ω or the operating pressure P of one or more electrically-powered hydraulic pump 40. In some embodiments, both the operating speed ω or the operating pressure P may be taken into consideration by controller 52 in order to distribute electric power based on demand. In some embodiments, other indication(s) of demand (e.g., pilot command) may be used instead of or in combination with those disclosed herein. Equations 1 and 2 below respectfully show an example of how values for the set points for the current limiters 50 may be determined using operating speed ω (see Equation 1) and operating pressure P (see Equation 2) in order to distribute power proportionally based on demand. The calculations associated with Equations 1 and 2 may be executed by controller 52 based on machine-readable instructions 58 (see FIG. 4). Even though Equations 1 and 2 below make reference to electrical current (i.e., $I_{lim}$, $I_{tot}$), it is understood that electrical current could be replaced by power in Equations 1 and 2 and used with known or other types of power distribution means.

$$I_{lim_i} = \frac{\omega_i}{\sum_{i=1}^{n}(\omega_i)} I_{tot} \quad \text{(Equation 1)}$$

$$I_{lim_i} = \left(1 - \frac{P_i}{\sum_{i=1}^{m}(P_i)}\right) I_{tot} \quad \text{(Equation 2)}$$

Where:
$I_{lim_i}$=Electric motor (i) current limiter set point
$\omega_i$=Electric motor (i) speed (rad/sec)
n=Total number of electric motors
m=Number of HPPs
$I_{tot}$=Total electric current available for distribution to electric motors
$P_i$=HPP (i) operating pressure (psi)

Figure 7:
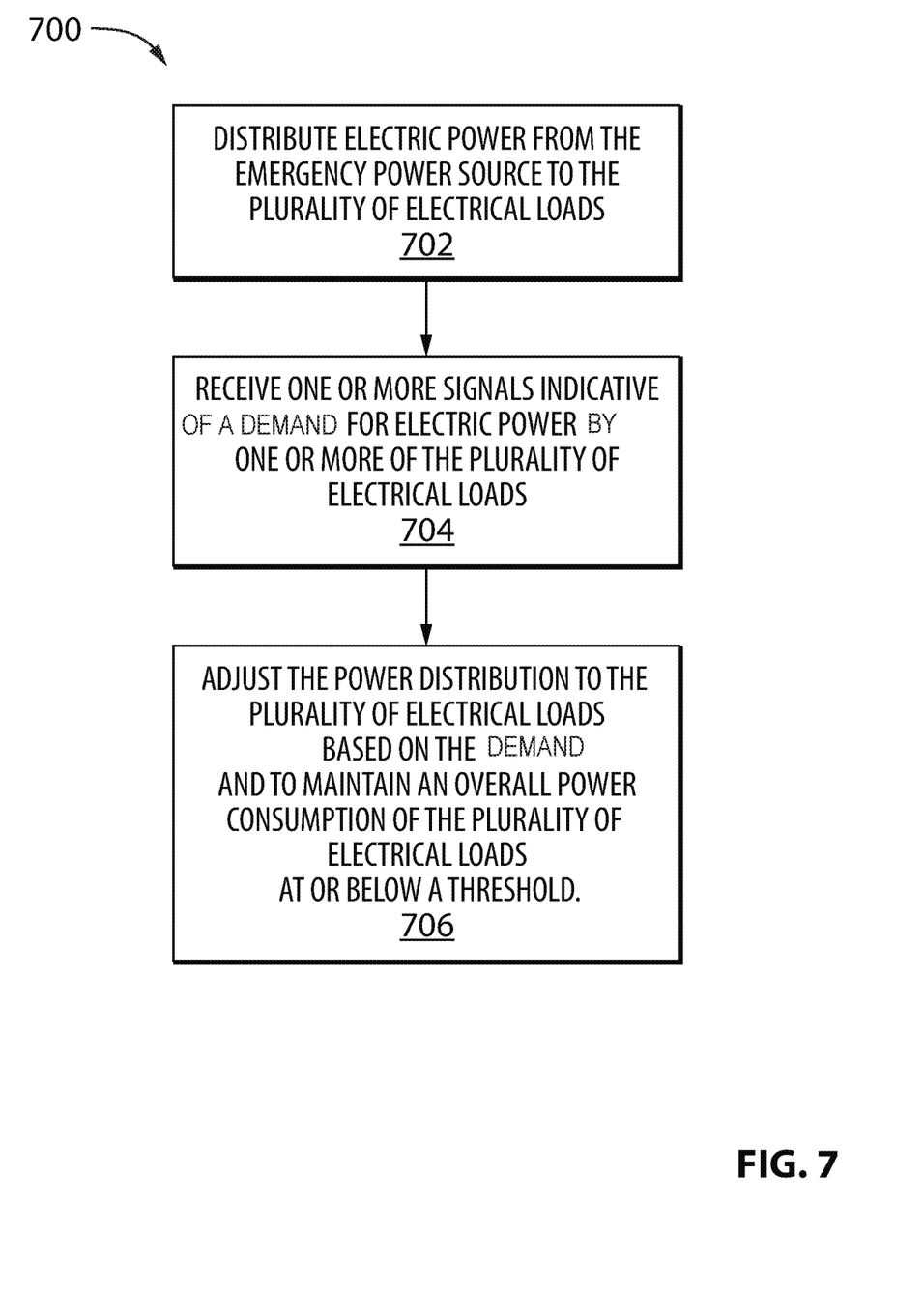
FIG. 7 is a flowchart illustrating an exemplary method for distributing electric power from a power source of the aircraft of FIG. 1 to a plurality of electrical loads during a limited power availability condition.

FIG. 7 is a flow chart illustrating an exemplary method 700 for distributing electric power from a power source (e.g., ADG 46) of aircraft 10 to a plurality of electrical loads A-N (see FIG. 4) of aircraft 10 during an limited power availability condition. Method 700 or part(s) thereof may be performed using apparatus 48 described above based at least in part on machine readable instructions 54. Alternatively, method 700 or part(s) thereof could be performed using an apparatus having a different configuration than those disclosed herein. In some embodiments, method 700 comprises: distributing electric power from the power source 46 of aircraft 10 operating during the limited power availability condition to the plurality of electrical loads A-N of aircraft 10 (see block 702); receiving one or more signals indicative of a demand for electric power by one or more of the plurality of electrical loads A-N of aircraft 10 (see block 704); and adjusting the power distribution to the plurality of electrical loads A-N based on the demand for electric power by one or more of the plurality of electrical loads A-N and to maintain an overall power consumption of the plurality of electrical loads A-N at or below a threshold $I_{TOT}$.

In some embodiments of method 700, the one or more signals may be indicative of the demand for electric power by each of the plurality of electrical loads A-N and the power distribution may be adjusted to distribute electric power to the electrical loads A-N proportionally based on the demand.

In some embodiments of method 700, the one or more signals indicative of the demand for electric power may be indicative of an operating parameter of the one or more electrical loads A-N.

In some embodiments of method 700, the one or more electrical loads A-N may each comprise an electrically-powered hydraulic pump 40 and the one or more signals indicative of the demand for electric power may be indicative of an operating speed ω of the one or more electrically-powered hydraulic pumps 40. For example, more electric power may be distributed to an electrically-powered hydraulic pump 40 having a higher operating speed ω than to an electrically-powered hydraulic pump 40 having a lower operating speed ω.

In some embodiments of method 700, the one or more electrical loads A-N may each comprise an electrically-powered hydraulic pump 40 and the one or more signals indicative of the demand for electric power may be indicative of an operating pressure P of the one or more electrically-powered hydraulic pumps 40. For example, more electric power may be distributed to an electrically-powered hydraulic pump 40 having a lower operating pressure P than to an electrically-powered hydraulic pump 40 having a higher operating pressure P.

In some embodiments of method 700, adjusting the power distribution may comprise adjusting a set point of one or more current limiters 50 respectively associated with one or more of the electrical loads A-N.

In some embodiments of method 700, the power source may comprise ADG 46.

In some embodiments of method 700, the plurality of electrical loads A-N may comprise a plurality of electrically-powered hydraulic pumps 40.

In some embodiments of method 700 where the one or more electrical loads A-N each comprise an electric motor (e.g., linear or rotary), the one or more signals indicative of the demand for electric power may be indicative of an operating speed of the one or more electric motors. Alternatively or in addition, the one or more signals indicative of the demand for electric power may be indicative of an output torque or output force of the one or more electric motors. In some embodiments, the one or more signals indicative of the demand for electric power may be indicative of an input to and/or an output of the one or more electrical loads A-N.

Figure 8:
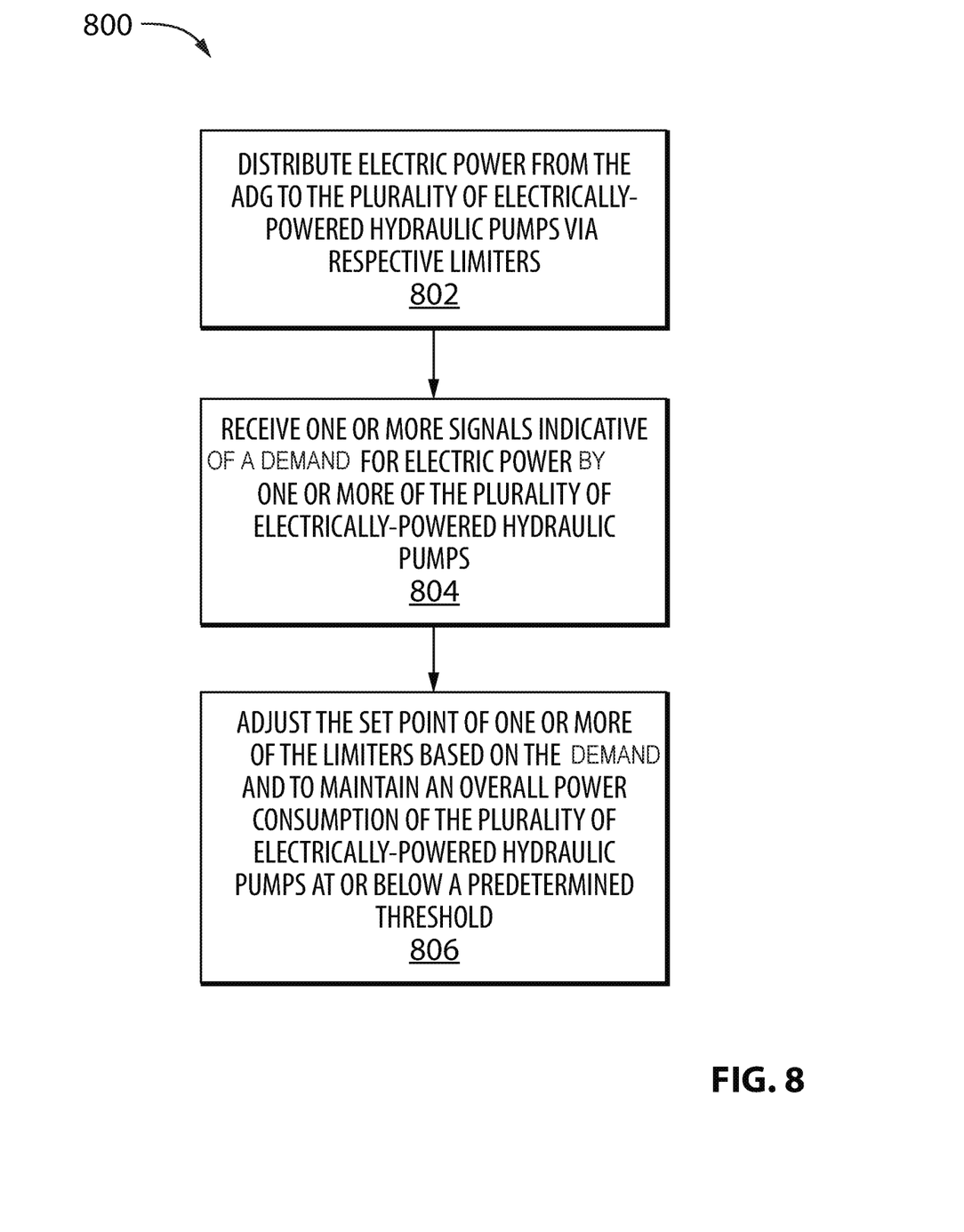
FIG. 8 is a flowchart illustrating an exemplary method for distributing electric power from an air-driven generator of the aircraft of FIG. 1 to a plurality of electrically-powered hydraulic pumps.

FIG. 8 is a flow chart illustrating an exemplary method 800 for distributing electric power from ADG 46 of aircraft 10 to a plurality of electrically-powered hydraulic pumps 40 of aircraft 10 during a limited power availability condition. Aspects of method 700 described above may also apply to method 800 and vice versa. Method 800 or part(s) thereof may be performed using apparatus 48 described above based at least in part on machine readable instructions 54. Alternatively, method 800 or part(s) thereof could be performed using an apparatus having a different configuration than those disclosed herein. In some embodiments, method 800 comprises: distributing electric power from ADG 46 of aircraft 10 to the plurality of electrically-powered hydraulic pumps 40 of aircraft 10 via respective current limiters 50 each having a variable set point (see block 802); receiving one or more signals indicative of a demand for electric power by one or more of the plurality of electrically-powered hydraulic pumps 40 of aircraft 10 (see block 804); and adjusting the set point of one or more of current limiters 50 based on the demand and to maintain an overall power consumption of the plurality of electrically-powered hydraulic pumps 40 at or below a predetermined threshold $I_{TOT}$ (see block 806).

In some embodiments of method 800, the one or more signals may be indicative of the demand for electric power by each of the plurality of electrically-powered hydraulic pumps 40 and the set point of the one or more of the current limiters 50 may be adjusted to distribute electric power to the electrically-powered hydraulic pumps 40 proportionally based on the demand.

In some embodiments of method 800, the one or more signals indicative of the demand for electric power may be indicative of an operating parameter of the one or more electrically-powered hydraulic pumps 40. For example, the one or more signals indicative of the demand for electric power may be indicative of an operating speed ω of the one or more electrically-powered hydraulic pumps 40. A set point associated with a current limiter 50 for an electrically-powered hydraulic pump 40 having a higher operating speed ω may be adjusted to a higher value than a set point associated with a current limiter 50 for an electrically-powered hydraulic pump 40 having a lower operating speed ω.

In some embodiments of method 800, the one or more signals indicative of the demand for electric power may be indicative of an operating pressure P of the one or more electrically-powered hydraulic pumps 40. A set point associated with a current limiter 50 for an electrically-powered hydraulic pump 40 having a lower operating pressure P may be adjusted to a higher value than a set point associated with a current limiter 50 for an electrically-powered hydraulic pump 40 having a higher operating pressure P.

The above description is meant to be exemplary only, and one skilled in the relevant arts will recognize that changes may be made to the embodiments described without departing from the scope of the invention disclosed. For example, the blocks and/or operations in the flowcharts and drawings described herein are for purposes of example only. There may be many variations to these blocks and/or operations without departing from the teachings of the present disclosure. For instance, the blocks may be performed in a differing order, or blocks may be added, deleted, or modified. The present disclosure may be embodied in other specific forms without departing from the subject matter of the claims. Also, one skilled in the relevant arts will appreciate that while the apparatus and methods disclosed and shown herein may comprise a specific number of elements/components or steps, the apparatus and methods could be modified to include additional or fewer of such elements/components or steps. The present disclosure is also intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

What is claimed is:

1. A method for distributing electric power from an air-driven generator of an aircraft to a plurality of electrically-powered hydraulic pumps of the aircraft, the method being performed using a controller, the method comprising:
   distributing electric power generated by the air-driven generator of the aircraft to the plurality of the electrically-powered hydraulic pumps of the aircraft via respective current limiters each having a variable set point;
   receiving one or more signals indicative of a demand for electric power by one or more of the plurality of electrically-powered hydraulic pumps of the aircraft; and
   adjusting the set point of one or more of the current limiters based on the demand and to maintain an overall power consumption of the plurality of electrically-powered hydraulic pumps at or below a predetermined threshold.

2. The method as defined in claim 1, wherein the one or more signals are indicative of the demand for electric power by each of the plurality of electrically-powered hydraulic pumps and the set point of the one or more of the current limiters is adjusted to distribute electric power to the electrically-powered hydraulic pumps proportionally based on the demand.

3. The method as defined in claim 1, wherein the one or more signals indicative of the demand for electric power are indicative of an operating parameter of the one or more electrically-powered hydraulic pumps.

4. The method as defined in claim 1, wherein the one or more signals indicative of the demand for electric power are indicative of an operating speed of the one or more electrically-powered hydraulic pumps.

5. The method as defined in claim 4, wherein adjusting a set point associated with a current limiter for an electrically-powered hydraulic pump having a higher operating speed to a higher value than a set point associated with a current limiter for an electrically-powered hydraulic pump having a lower operating speed.

6. The method as defined in claim 1, wherein the one or more signals indicative of the demand for electric power are indicative of an operating pressure of the one or more electrically-powered hydraulic pumps.

7. The method as defined in claim 6, comprising adjusting a set point associated with a current limiter for an electrically-powered hydraulic pump having a lower operating pressure to a higher value than a set point associated with a current limiter for an electrically-powered hydraulic pump having a higher operating pressure.

8. A method for distributing electric power from a power source of an aircraft to a plurality of electrical loads of the aircraft during a limited power availability condition, the method comprising:
 distributing electric power from the power source of the aircraft operating during the limited power availability condition to the plurality of electrical loads of the aircraft;
 receiving one or more signals indicative of a demand for electric power by one or more of the plurality of electrical loads of the aircraft; and
 adjusting the power distribution to the plurality of electrical loads based on the demand for electric power by the one or more plurality of electrical loads and to maintain an overall power consumption of the plurality of electrical loads at or below a threshold,
 wherein the one or more signals are indicative of the demand for electric power by each of the plurality of electrical loads and the power distribution is adjusted to distribute electric power to the electrical loads proportionally based on the demand.

9. The method as defined in claim 8, wherein the one or more signals indicative of the demand for electric power are indicative of an operating parameter of the one or more electrical loads.

10. The method as defined in claim 8, wherein the one or more electrical loads each comprise an electrically-powered hydraulic pump and the one or more signals indicative of the demand for electric power are indicative of an operating speed of the one or more electrically-powered hydraulic pumps.

11. The method as defined in claim 10, comprising distributing more power to an electrically-powered hydraulic pump having a higher operating speed than to an electrically-powered hydraulic pump having a lower operating speed.

12. The method as defined in claim 8, wherein the one or more electrical loads each comprise an electrically-powered hydraulic pump and the one or more signals indicative of the demand for electric power are indicative of an operating pressure of the one or more electrically-powered hydraulic pumps.

13. The method as defined in claim 12, comprising distributing more power to an electrically-powered hydraulic pump having a lower operating pressure than to an electrically-powered hydraulic pump having a higher operating pressure.

14. The method as defined in claim 8, wherein adjusting the power distribution comprises adjusting a set point of one or more current limiters respectively associated with one or more of the electrical loads.

15. The method as defined in claim 8, wherein the power source comprises an air-driven generator of the aircraft.

16. The method as defined in claim 8, wherein the plurality of electrical loads comprises a plurality of electrically-powered hydraulic pumps.

17. The method as defined in claim 8, wherein the one or more electrical loads each comprise an electric motor and the one or more signals indicative of the demand for electric power are indicative of an operating speed of the one or more electric motors.

18. The method as defined in claim 8, wherein the one or more electrical loads each comprise an electric motor and the one or more signals indicative of the demand for electric power are indicative of an output torque of the one or more electric motors.

19. The method as defined in claim 8, wherein the one or more signals indicative of the demand for electric power are indicative of an output of the one or more electrical loads.

20. An apparatus for distributing electric power from a power source of an aircraft to a plurality of electrical loads of the aircraft during a limited power condition, the apparatus comprising:
 a plurality of limiters respectively associated with each of the electrical loads and respectively configured to limit an amount of electric power distributed from the power source to each of the electrical loads, each limiter having a variable set point; and
 a controller configured to:
  receive one or more signals indicative of a demand for electric power by one or more of the plurality of electrical loads of the aircraft; and
  adjust the set point of one or more of the limiters based on the demand and to maintain an overall power consumption of the plurality of electrical loads at or below a predetermined threshold,
 wherein the plurality of electrical loads comprises a plurality of electrically-powered hydraulic pumps.

21. The apparatus as defined in claim 20, wherein the one or more signals are indicative of the demand for electric power by each of the plurality of electrical loads and the controller is configured to adjust the set point of the one or more of the limiters to distribute electric power to the electrical loads proportionally based on the demand.

22. The apparatus as defined in claim 20, wherein the one or more signals indicative of the demand for electric power are indicative of an operating parameter of the one or more electrical loads.

23. The apparatus as defined in claim 20, wherein the one or more of the electrical loads each comprise one of the electrically-powered hydraulic pumps and the one or more signals indicative of the demand for electric power are indicative of an operating speed of the one or more of the electrically-powered hydraulic pumps.

24. The apparatus as defined in claim 23, wherein the controller is configured to adjust a set point associated with a limiter for one of the electrically-powered hydraulic pumps having a higher operating speed to a higher value than a set point associated with a limiter for another of the electrically-powered hydraulic pumps having a lower operating speed.

25. The apparatus as defined in claim 20, wherein the one or more of the electrical loads each comprise one of the electrically-powered hydraulic pumps and the one or more signals indicative of the demand for electric power are indicative of an operating pressure of the one or more of the electrically-powered hydraulic pumps.

26. The apparatus as defined in claim 25, wherein the controller is configured to adjust a set point associated with a limiter for one of the electrically-powered hydraulic pumps having a lower operating pressure to a higher value than a set point associated with a limiter for another of the electrically-powered hydraulic pumps having a higher operating pressure.

27. The apparatus as defined in claim 20, wherein the power source comprises an air-driven generator of the aircraft.

28. The apparatus as defined in claim 20, wherein the one or more electrical loads each comprise an electric motor and the one or more signals indicative of the demand for electric power are indicative of an operating speed of the one or more electric motors.

29. The apparatus as defined in claim 20, wherein the one or more electrical loads each comprise an electric motor and the one or more signals indicative of the demand for electric power are indicative of an output torque of the one or more electric motors.

30. The apparatus as defined in claim 20, wherein the one or more signals indicative of the demand for electric power are indicative of an output of the one or more electrical loads.

31. The apparatus as defined in claim 20, wherein the one or more signals indicative of the demand for electric power are indicative of an input to the one or more electrical loads.

32. The apparatus as defined in claim 20, wherein the limiters comprise electric current limiters.

33. An aircraft comprising the apparatus as defined in claim 20.

* * * * *